United States Patent

Monds et al.

[15] 3,694,563
[45] Sept. 26, 1972

[54] CONDUITS

[72] Inventors: Derek Henry Monds, Windsor; Brian Charles Wills, Ascot, both of England

[73] Assignee: Smith Industries Limited, London, England

[22] Filed: May 3, 1971

[21] Appl. No.: 139,443

[52] U.S. Cl. .................... 174/97, 138/111, 174/10, 174/68 C, 174/72 C, 174/105 R
[51] Int. Cl. .................................................. H02g 3/28
[58] Field of Search ..174/102 D, 105 R, 106 D, 107, 174/68 R, 68 C, 70 R, 70 C, 95, 97, 72 R, 10; 138/111, 112, 115, 116, 117, 118, 121

[56] References Cited

UNITED STATES PATENTS

| | | | |
|---|---|---|---|
| 2,043,044 | 6/1936 | Knoderer | 174/103 X |
| 1,843,836 | 2/1932 | Romeiser | 174/103 |
| 3,430,337 | 3/1969 | Kelly | 174/103 X |
| 1,784,217 | 12/1930 | Berry | 174/103 X |
| 355,867 | 1/1887 | Denison | 138/117 X |

FOREIGN PATENTS OR APPLICATIONS 644,589   10/1950   Great Britain..........174/117 F

*Primary Examiner*—Lewis H. Myers
*Assistant Examiner*—A. T. Grimley
*Attorney*—William D. Hall, Elliott I. Pollock, Fred C. Philpitt, George Vande Sande, Charles F. Steininger and Robert R. Priddy

[57] ABSTRACT

A conduit having a plurality of bores comprises an indented metal shell which defines the bores and which is corrugated transversely of the bores. The conduit includes a lining for the bores which is both flexible and has physical characteristics selected in accordance with intended use of the conduit. For example, the conduit may be for electric cables and, in such a case, the material constituting the lining is selected so as to provide electrical insulation between the cables and the metal shell, and so as, at least partially, to inhibit ingress of moisture into the bores. The conduit is formed by firstly forming a corrugated tube from a metal strip and thereafter indenting the tube continuously along its length by means of one or more pairs of co-operating profiled rollers.

11 Claims, 6 Drawing Figures

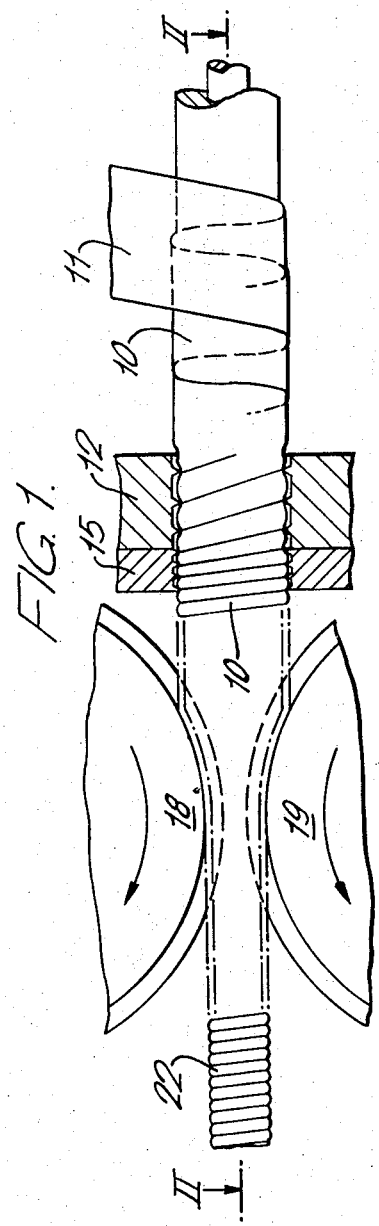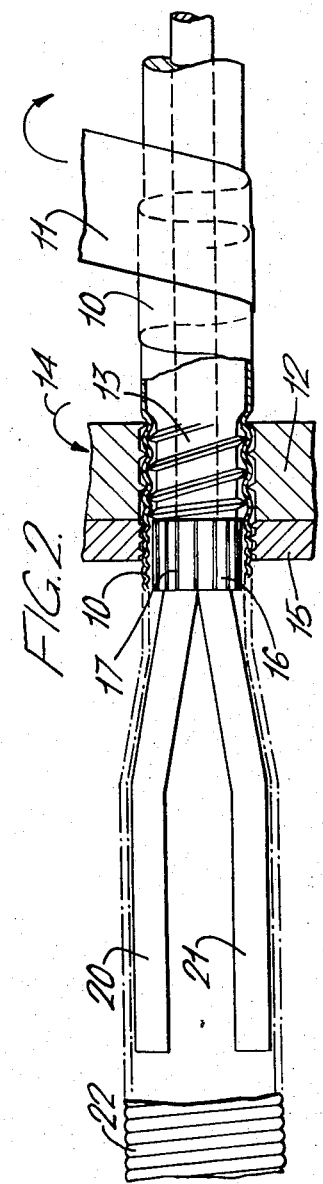

CONDUITS

This invention relates to conduits, and, more particularly, to conduits having a plurality of bores, and methods of, and machines for, making such conduits.

According to one aspect of the present invention there is provided a conduit having a plurality of bores, comprising an indented metal shell which defines the bores and which is corrugated transversely of the bores.

The corrugations readily enable the conduit to be bent in either of two directions which are normal to one another and which are both normal to the longitudinal axes of the bores. Furthermore, the corrugated metal shell serves to retain the conduit in its bent shape.

The conduit may include a lining for the bores which is flexible and has physical characteristics selected in accordance with the intended use of the conduit. For example, the conduit may be for electric cables and, in such a case, the material or materials used to constitute the lining may be selected so as to provide electrical insulation between the cables and the metal shell. Also, the said material or materials may be selected so as, at least partially, to inhibit ingress of moisture into the bores.

The lining may be provided by tubes mounted in the bores of the conduit or, alternatively, the lining may be integral with, and extend completely over, the inner surface of the metal shell. In the latter case both the metal shell and the lining may be corrugated transversely of the bores.

A web may be provided between the or each pair of adjacent bores. In such a case, the conduit may be secured in position by, for example, nails extending through the web or webs.

According to a second aspect of the present invention there is provided a method of making a conduit having a plurality of bores from a metal tube having a single bore, comprising applying pressure to the tube to indent the tube along its length and thereby form a conduit having a plurality of parallel bores.

The tube may be indented continuously along its length.

According to a third aspect of the present invention there is provided a machine for making a conduit having a plurality of bores from a metal tube having a single bore, comprising a plurality of mandrels over which the tube is to be passed, the number of mandrels being equal to the number of bores, and means which is arranged to indent the tube along its length between the or each pair of adjacent mandrels. Preferably, the said means is arranged to indent the tube continuously along its length, and, in such a case, the said means may comprise one or more pairs of co-operating profiled rollers.

Various forms of conduits for electrical cables, and methods of making such conduits, in accordance with the present invention will now be described, by way of example, with reference to the accompanying drawings in which:

FIG. 1 shows diagrammatically a machine, partly in section, for making one form of the conduit;

FIG. 2 is a view of the machine on the line II—II of FIG. 1;

Figure 3:
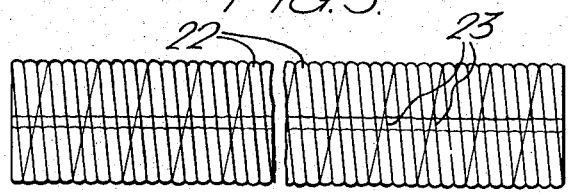
FIGS. 3 and 4 show, respectively, a side view and an end view of the conduit produced by the apparatus of FIGS. 1 and 2.

The conduit if formed by, firstly, producing a corrugated tube having a single bore, and thereafter, applying pressure to the corrugated tube to indent the tube continuously along its length and thereby form a conduit having a plurality of parallel bores.

Referring to FIGS. 1 and 2, a tube 10 comprises three layers of material, an inner layer of bitumenised Kraft paper, an intermediate layer of Kraft paper, and an outer layer of aluminum. The materials are in strip form and are successively wound on to a mandrel, not shown, each strip being helically wound on to the mandrel with adjacent turns thereof overlapping one another. The aluminum strip is shown at 11. The so formed tube 10 is then fed between an outer former 12 and an inner former 13, having co-operating threads, the formers 12 and 13 being rotated together in the direction of an arrow 14 (FIG. 2) to form helical corrugations on the tube 10 of opposite hand to that of the helically wound strip material. The tube 10 is thereafter passed between an outer former 15, also rotated in the direction of the arrow 14, and a stationary snubber 16. The inner peripheral surface of the outer former 15 has a thread which engages the tube 10 to reduce the pitch of the helical corrugations on the tube 10. The snubber 16 urges the tube 10 into engagement with the outer former 15 and has ribs 17 which engage the tube 10 to inhibit any tendency for the tube 10 to rotate.

Figure 4:
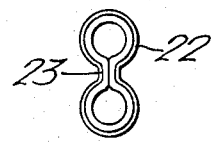

The corrugated tube 10 is fed between a pair of profiled rollers 18 and 19 which co-operate with internal support mandrels 20 and 21 carried by the snubber 16 to indent the tube 10 continuously along its length between the support mandrels 20 and 21 and thereby form a twin-bored conduit 22. The conduit 22 is shown in FIGS. 3 and 4. The rollers 18 and 19 are shaped so as to provide a web 23 between the bores of the conduit 22 through which nails may be driven to secure the conduit 22 in position. In use the metal outer layer of the conduit 22 is grounded and, therefore, if one of the nails is inadvertently driven through a portion of the conduit 22 carrying an electric cable, the cable will also be grounded.

The intermediate layer of Kraft paper serves to provide the desired electrical insulation between electrical cables in the bores of the conduit 22 and the metal outer layer. Ingress of moisture into the bores of the conduit 22 is prevented by the inner layer of bitumenised Kraft paper.

Adjacent portions of the inner layer of bitumenised Kraft paper in the vicinity of the web 23 may be joined together by applying heat to the web 23. This may be effected when the web 23 is formed and, in such a case, the rollers 18 and 19 are heated. Alternatively, the heating may be effected after the web 23 has been formed by running a pair of heated rollers (not shown) along the web 23.

The helical corrugations of the conduit 22 readily enable it to be sent in either of two directions, one direction being in a plane extending through the longitudinal axes of the both of the bores, and the other direction being at right angles to both the said plane and the longitudinal axes of the bores. Furthermore, the metal layer serves to retain the conduit in its bent shape.

The conduit 22 has particular application in panel wiring, or as part of a wiring harness for use in the construction industry.

Draw-wires may be placed in the bores of the conduit 22 during its manufacture to facilitate subsequent insertion of the electric cables into the bores of the conduit 22. Alternatively, the electric cables may be mounted in the bores of the conduit 22 during its manufacture. In such a case, the mandrels 20 and 21 are replaced by a pair of electric cables which are fed through the machine together with the tube 10. The electric cables are arranged to support the tube 10 internally and to co-operate with the profiled rollers 18 and 19. This modified method of making the conduit 22 ensures that the electric cables are protected against abrasion or rough handling both before as well as after being mounted in the conduit 22.

Figure 5:
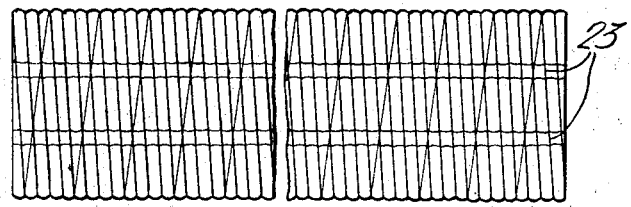
FIGS. 5 and 6 show, respectively, a side view and an end view of an alternative form of the conduit.
Figure 6:
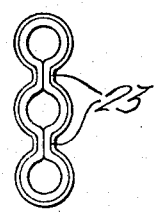

The conduit 22 may have more than two bores. Such a conduit having three bores disposed side by side is shown in FIGS. 5 and 6. This conduit may be readily formed by providing two pairs of the profiled rollers spaced apart transversely of the tube 10 and by providing three appropriately positioned mandrels for co-operating with the profiled rollers.

The conduits shown in FIGS. 3 and 4, and FIGS. 5 and 6, require less space in depth than the equivalent types of circular cross-section known heretofor.

The inner and intermediate layers of the tube 10 may be replaced by preformed tubes of, for example, plastics inserted in each of the bores of the conduit 22 during manufacture. In such a case, the said preformed tubes replace the mandrels 20 and 21 and are fed through the machine together with the corrugated metal tube and secured in position to line the bores of the conduit 22 when the corrugated metal tube is indented by the profiled rollers 18 and 19. In this form of the conduit, the electric cables are mounted in the said preformed tubes before these tubes are inserted into the corrugated metal tube. The portions of the metal tube in the vicinity of the web 23 may be welded together. This may be effected by the rollers 18 and 19 in which case the rollers 18 and 19 are arranged to constitute the welding electrodes and are electrically connected to a source of welding current. Alternatively, the welding may be effected after the metal tube has been indented by running along the web 23 a pair of rollers (not shown) which are arranged to constitute welding electrodes and are electrically connected to a source of welding current.

We claim:

1. A conduit having a plurality of bores, comprising an indented metal shell which defines the bores and which is corrugated transversely of the bores, and a lining which is integral with, and extends completely over the inner surface of the metal shell, the lining having a first layer of electrically insulating material and a second layer of a material which is substantially impervious to moisture.

2. A conduit according to claim 1, wherein the first layer is of Kraft paper and the second layer is of bitumenised Kraft paper.

3. A conduit having at least a pair of bores comprising an indented metal shell having tubular portions which define respective ones of the bores and which are corrugated transversely of the bores, the indentation of said shell being sufficient to bring opposing sides of the shell into contiguity to define a web extending between the said corrugated tubular portions.

4. A conduit having a plurality of bores comprising an indented metal shell which defines the bores, and a flexible lining which is integral with, and extends completely over, the inner surface of the metal shell, the metal shell and the lining both being corrugated transversely of the bores.

5. A conduit comprising a continuous metal shell having a plurality of bores, said continuous shell comprising an elongated metal strip wound helically to have adjacent turns overlapping one another, the said shell being indented along its length to define said bores and being helically corrugated transversely of said bores, the direction of said helical corrugations being of opposite hand to that of said helically wound strip.

6. A conduit according to claim 5, wherein the conduit is for use with electric cables, and wherein draw-wires are disposed in the bores to facilitate insertion of electric cables into the bores.

7. A conduit according to claim 5, wherein electric cables are disposed in the bores.

8. A conduit according to claim 5 including a flexible lining for the said bores.

9. A conduit according to claim 8 wherein the said lining is corrugated transversely of the bores.

10. A conduit according to claim 8, wherein the lining is provided by tubes mounted in the bores of the conduit.

11. A conduit according to claim 8, wherein the lining is integral with, and extends completely over, the inner surface of the metal shell.

* * * * *